US008138625B2

(12) United States Patent  
Duan et al.

(10) Patent No.: US 8,138,625 B2
(45) Date of Patent: Mar. 20, 2012

(54) DUAL LINE ACTIVE AUTOMATIC TRANSFER SWITCH

(75) Inventors: Jiwu Duan, Tucson, AZ (US); Steven M. Groff, Tucson, AZ (US); Trung Le, Tucson, AZ (US); Juan A. Yanes, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 12/565,084

(22) Filed: Sep. 23, 2009

(65) Prior Publication Data

US 2011/0068625 A1 Mar. 24, 2011

(51) Int. Cl.
G06F 1/00 (2006.01)

(52) U.S. Cl. ............... 307/29; 307/11; 307/18; 307/23; 307/43; 307/64; 713/300

(58) Field of Classification Search .................. None
See application file for complete search history.

(56) References Cited

U.S. PATENT DOCUMENTS

| | | | | |
|---|---|---|---|---|
| 4,356,402 A | * | 10/1982 | Morimoto et al. | 307/19 |
| 4,400,626 A | * | 8/1983 | Lacy | 307/66 |
| 4,413,220 A | * | 11/1983 | Waineo | 320/118 |
| 5,808,378 A | * | 9/1998 | O'Leary | 307/87 |
| 6,011,327 A | | 1/2000 | Cook et al. | |
| 6,031,298 A | | 2/2000 | Lo et al. | |
| 6,469,265 B1 | | 10/2002 | Penix et al. | |
| 6,630,752 B2 | | 10/2003 | Fleming et al. | |
| 6,870,723 B1 | | 3/2005 | Kramer | |
| 7,141,892 B2 | * | 11/2006 | Dai et al. | 307/64 |
| 7,468,566 B2 | | 12/2008 | Serrano et al. | |
| 2004/0169422 A1 | * | 9/2004 | Eaton et al. | 307/64 |
| 2004/0189094 A1 | * | 9/2004 | Hori | 307/29 |
| 2005/0006956 A1 | * | 1/2005 | Shi | 307/43 |
| 2006/0167569 A1 | | 7/2006 | Colombi et al. | |
| 2007/0210652 A1 | | 9/2007 | Tracy et al. | |
| 2008/0084112 A1 | * | 4/2008 | Kumar et al. | 307/31 |
| 2008/0150363 A1 | | 6/2008 | Kuo | |
| 2008/0157597 A1 | * | 7/2008 | Pratt et al. | 307/31 |
| 2008/0179958 A1 | | 7/2008 | Lathrop et al. | |
| 2009/0327793 A1 | * | 12/2009 | Kim et al. | 713/501 |
| 2010/0141047 A1 | * | 6/2010 | Gibbs et al. | 307/126 |

OTHER PUBLICATIONS

Ashour, Handy; "Automatic Transfer Switch (ATS) Using Programmable Logic Controller (PLC)", Proceedings of the IEEE International Conference on, Jun. 3-5, 2004, pp. 531-535.

* cited by examiner

Primary Examiner — Jared Fureman
Assistant Examiner — Justen Fauth
(74) Attorney, Agent, or Firm — Griffiths & Seaton PLLC (57) ABSTRACT

A dual line active automatic transfer switch (ATS) is provided. A first switch structure is connected to a first PSU of the plurality of PSUs, and operable between a first position connecting a first input line of the dual line and a second position connecting a second input line of the dual line with the one PSU. A second switch structure is connected to at least one additional PSU of the plurality of PSUs, and operable between a third position connecting the first input line and a fourth position connecting the second input line with the at least one additional PSU. The first and second switch structures are operable between each of the first, second, third, and fourth positions to alternatively connect each of the plurality of PSUs to one of the first and second input lines and connect, when each of the dual lines is charged, both of the first and second input lines to at least one of the plurality of PSUs.

18 Claims, 8 Drawing Sheets

DUAL LINE ACTIVE AUTOMATIC TRANSFER SWITCH

FIELD OF THE INVENTION

The present invention relates in general to power supplies for electronic devices, and more particularly, but not exclusively, to a dual line active automatic transfer switch (ATS) for use in computing environments.

DESCRIPTION OF THE RELATED ART

An N+1 redundant power system includes a number (N+1) of independent power units (such as power supplies) connected to the electrical devices, such that if one power unit fails, the system continues to function normally with the remaining N units. When N=2, for example, an N+1 redundant power system has three power units. This type of power architecture provides redundancy with minimal cost and size.

High availability computer systems are expected to be powered by two independent line cords. The most common method to provide two line cord redundancy to an N+1 redundant power system is to use a transfer switch. The transfer switch connects either the first line cord or the second line cord, but not both, to the electrical loads.

When only a single line cord can supply power to a system at a time, service circuit breakers often operate close to their rating limits. Such operation limits the available safety margin of the system. In addition, drawing the total system load from one service and zero from the other service limits efficient utilization of available facilities resources. Finally, as will be described further, conventional transfer switches exacerbate potential issues of single fault propagation.

SUMMARY OF THE INVENTION

In view of the foregoing, a need exists for a mechanism connecting dual line cords to one or more electrical loads allowing better utilization of available facilities resources, increasing of safety margins and reducing or eliminating fault propagation. Accordingly, various embodiments for a dual line active automatic transfer switch (ATS) are disclosed. In one such embodiment, by way of example only, a first switch structure is connected to a first PSU of the plurality of PSUs, and operable between a first position connecting a first input line of the dual line and a second position connecting a second input line of the dual line with the first PSU. A second switch structure is connected to at least one additional PSU of the plurality of PSUs, and operable between a third position connecting the first input line and a fourth position connecting the second input line with the at least one additional PSU. The first and second switch structures are operable between each of the first, second, third, and fourth positions to alternatively connect each of the plurality of PSUs to one of the first and second input lines and connect, when each of the dual lines is charged with electrical power, both of the first and second input lines to at least one of the plurality of PSUs.

Additional apparatus and method of manufacture embodiments are disclosed and provide related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
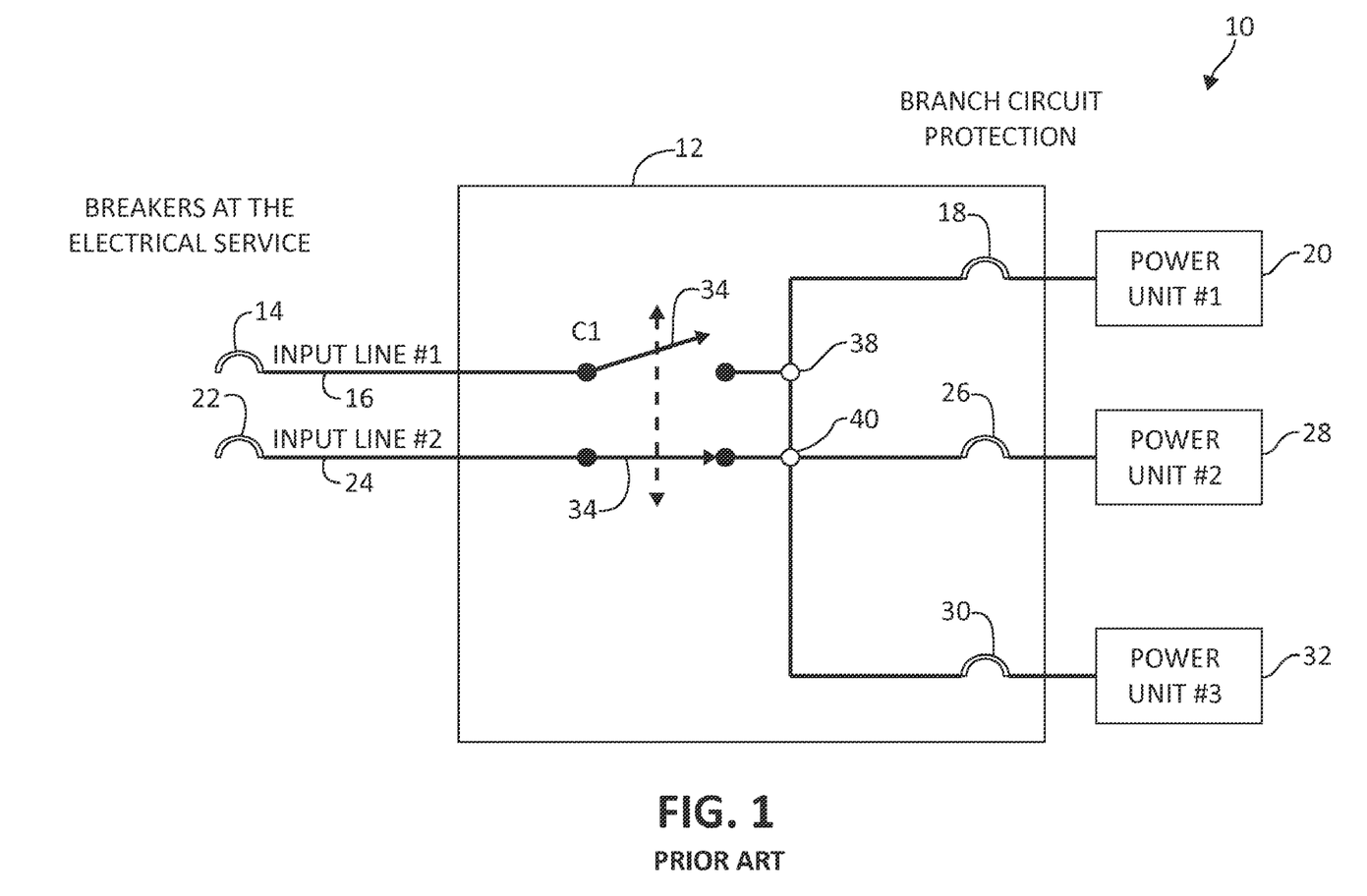
FIG. 1 is a block/schematic diagram of a conventional power transfer switch.

Turning to FIG. 1, a conventional power transfer switch 12 is illustrated as part of an overall power transfer system 10. Power transfer system 10 includes power supply units 64, 82, and 88 configured in an N+1 redundant power systems architecture. A first input line 16 is connected between circuit breaker 14 at the electrical service, and a first contactor 34. Similarly, a second input line 24 is connected between circuit breaker 22 and a second contactor 34. Contactor 34 is coupled with each of power units 20, 28, and 32 at node 38. Again, similarly, contactor 36 is coupled with each of power units 20, 28, and 32 at node 40. The contactors 34 and 36 allow each of the loads connected to power units 20, 28, and 32 to be connected with either input line 16, or input line 24, but not both as will be further explained. Branch circuit protection 18, 26, and 30 provides circuit protection functionality to each of the power supply units 20, 28, and 32.

Figure 2:
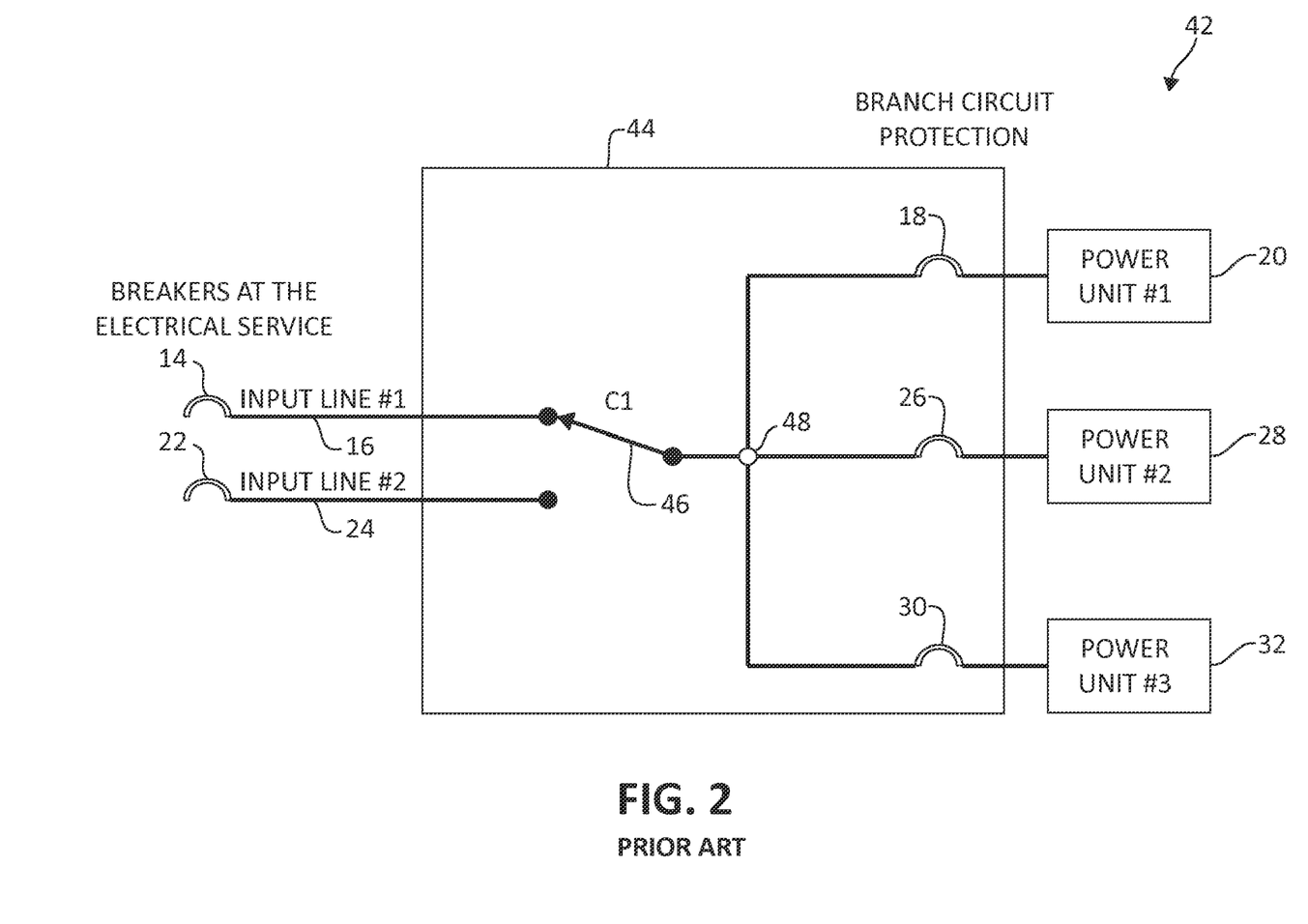
FIG. 2 is a block/schematic diagram of an additional conventional power transfer switch.

FIG. 2, following, depicts an additional conventional power transfer switch 44 as part of an overall power transfer system 42 in a simplified representation. Here as before, the power transfer system 42 includes circuit breaker 14 for input line 16, and circuit breaker 22 for input line 24. Branch circuit protection 18, 26 and 30 is provided again for power supply units 20, 28, and 32, respectively. A contactor 46 provides power supplied from input lines 16 and 24 to each of power supplies 20, 28, and 32. Here again, the contactor 46 is only able to provide power from one of input lines 16 and 24 to the power units 20, 28, and 32 via a common node 48.

With reference to FIGS. 1 and 2, it is commonly understood that single-pole, double-throw relays may be used with lower power automatic transfer switches. Contactors 34, 36 (FIG. 1) and 46 (FIG. 2) are a type of relay capable of disconnecting large currents. With specific reference to FIG. 1, two multi-pole power contactors 34 and 36 are configured with mechanically linked contact elements. The linked contacts assure that only one contactor is closed at a time. A closed contactor physically prevents the partner's contacts from closing. Additional safety is achieved by wiring each contactor's auxiliary contacts to electrically block the current to the partner's electrical coil. This type of configuration is referred to as a "safety contactor."

Ideally, an electrical fault at a branch load that introduces a load transient should only trip the branch circuit protection, thereby isolating the fault. Under a fault condition, a heavily loaded service (wall) breaker operates close to its current rating may trip before the branch circuit protection on line #1 activates. This event is detected by the transfer switch as a loss of line input, causing the transfer switch to connect the fault to line #2. The same branch load fault then trips the service breaker on line #2. At this point, all power is lost to the system. This is the nature of so called "single fault propagation" when using automatic transfer switches.

Such a scenario as described above may be avoided if the race condition between the branch circuit protection and the service breaker can eliminated or substantially minimized. A fast acting branch circuit protection combined with a more lightly loaded service breaker can stop the race condition. The load on each service breaker can be reduced if both service breakers can be made to share the system load. The mechanisms of the present invention enable to reduce loads on each service breaker and accordingly share load current between both input line cords, reducing the load on each service breaker and reducing, if not eliminating, the potential race condition.

In some implementations, to avoid some of the limitations previously described by conventional systems, 2N architectures are used in place of N+1 architectures, avoiding the need for a transfer switch. Such 2N architecture includes a number (2N) of independent power units, such that with N failed power unit(s), the system will operate normally using the remaining N units. When N=1, for example, a 2N redundant power system has two power units. This type of power architecture provides redundancy at 133% the cost and size of the N+1 system (excluding transfer switch cost and size). Accordingly, the mechanisms of the present invention, in contrast, allow for continued use of less expensive N+1 architecture systems.

Another alternative solution includes increasing the amperage of services feeding the system. Such an increase in current also comes at a higher price, however, if such implementation is even possible. In practice, worldwide services are limited to 30 A, 50 A, or 60 A input line currents. High density rack computing systems easily approach the 60 A limit, and facilities upgrades add additional cost and resource allocation. Here again, the mechanisms of the present invention, in contrast, allow for implementation of a less costly alternative, while enhancing security and reliability.

The illustrated embodiments, following, provide mechanisms for automatic connection of two power line cords to at least one electrical load. As will be seen, these mechanisms include a power distribution and switch structure that connects the entire electrical load to a single line cord, or alternatively, connects isolated segments of the load to both line cords when both line cords are charged with electrical power. The illustrated embodiments preclude the need to upgrade to larger services by sharing the load between both electrical services. The safety margin for the circuit breakers is increased by operating significantly below their ratings. The lightly-loaded service/circuit breakers are correspondingly more effective at stopping fault propagation. Finally, the illustrated embodiments allow for more effective utilization of available electrical system resources by drawing current from both service breakers and line cords. The illustrated embodiments are implemented to lower the current on an individual line cord by allowing the N+1 redundant power system to share currents between all available line cords.

Figure 3:
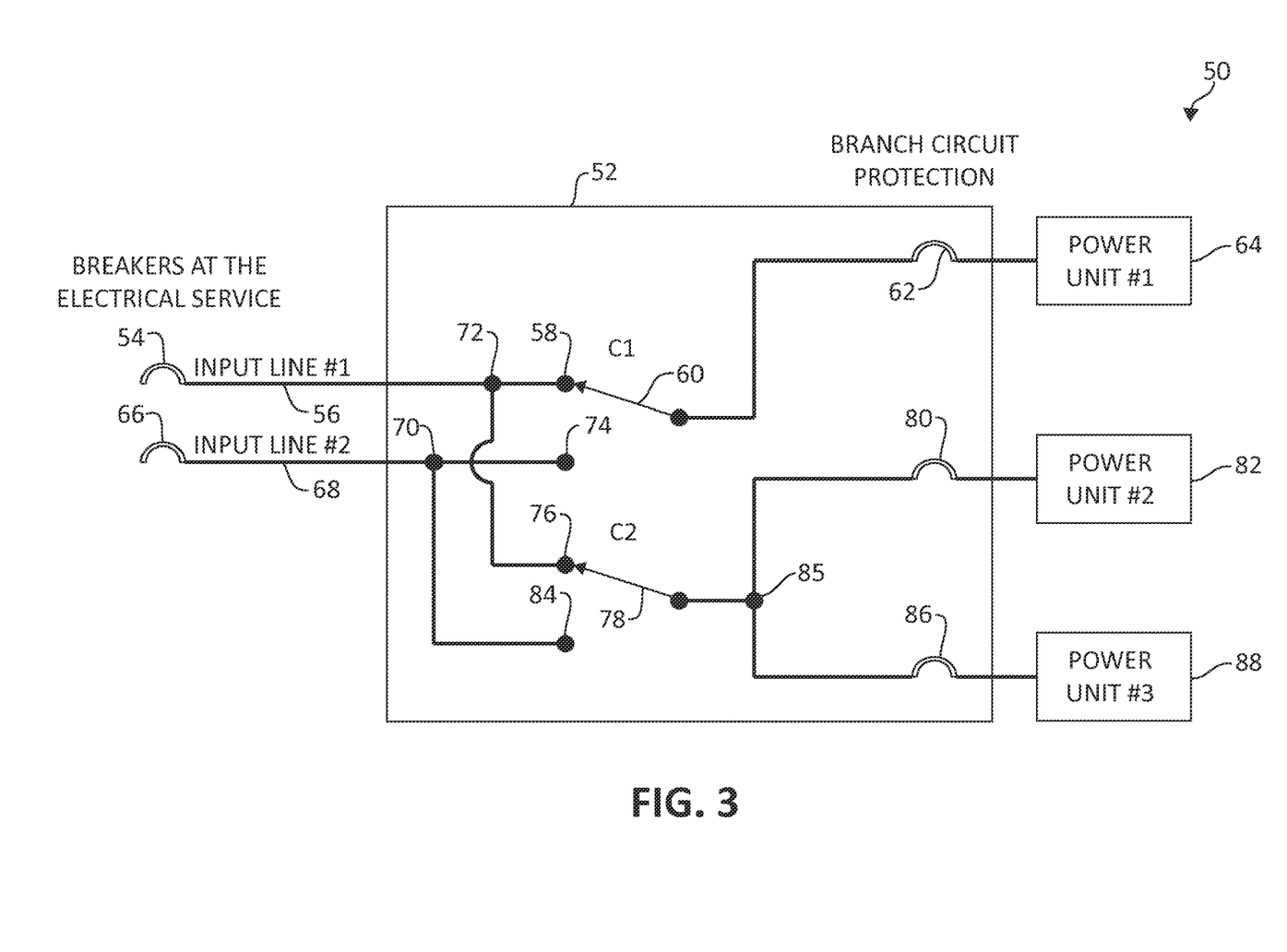
FIG. 3 is a block/schematic diagram of an exemplary dual line active automatic transfer switch in which aspects of the present invention may be implemented, shown in a first mode of operation.

Turning now to FIG. 3, an exemplary embodiment of a dual line active automatic transfer switch (ATS) 52 as part of an overall power transfer system 50 is illustrated. A service breaker 54 is shown connected to input line 56 (input line #1), while a second service breaker 66 is shown connected to input line 68 (input line #2). Input line 56 is connected through node 58 to a first switch structure 60. In addition, input line 56 is also coupled through node 72 and 76 to a second switch structure 78. The skilled artisan will appreciate that the switch structures 60 and 78 may include a variety of switches, relays, contactors, controlled switches, and other switch devices.

Input line 68 is coupled through node 74 to switch structure 60. Similarly, input line 68 is also coupled through node 70 and 84 to switch structure 78. As shown, switch structure 60 as coupled to node 58, and switch structure 78 as coupled to node 76 constitute a first operating mode (state) of the ATS 52. In the mode shown, electrical power from the input line 56 is transferred via switch structure 60 to the branch circuit protection 62 and on to power supply unit (PSU) 64. Electrical power from the input line 56 is also transferred via switch structure 78 to both of circuit protection devices 80 and 86, and PSUs 82 and 88 through shared node 85. Accordingly, all of the PSUs 64, 82, and 88 receive power from a single input line 56 in the depicted operating mode. In such mode, one line cord power is in tolerance (perhaps as a result of a failure of the other line), and the N+1 PSUs are functioning normally. In this way, power is supplied to all PSUs in the system from one input line cord.

Branch circuit protection devices 62, 80, and 86 (as well as service breakers 54 and 66) may, as one skilled in the art will anticipate, vary for a particular implementation. For example, branch circuit protection devices 62, 80, and 86 may include fuses, fuse elements, fusible links, circuit breakers, and the like as the skilled artisan will expect.

A controller 55 is coupled to the ATS 52, and thereby, to each of the switch structures 60 and 78. The controller 55 may be adapted as one skilled in art would anticipate, to monitor input line voltage and/or current levels (e.g., to monitor line quality), for example, and actuate switch structures 60 and 78 to provide the most efficient power transfer to PSUs 64, 82, and 88. Controller 55 may provide a control signal to the switch structures 60 and 78 upon a detection of a power disruption from one or more of the input lines 56 and 68, and/or a failure of one of the PSUs 64, 82, and 88. As one skilled in the art will expect, disconnect switches 60 and 78 may include transistor devices, such as metal oxide semiconductor field effect transistors (MOSFETs).

Figure 4:
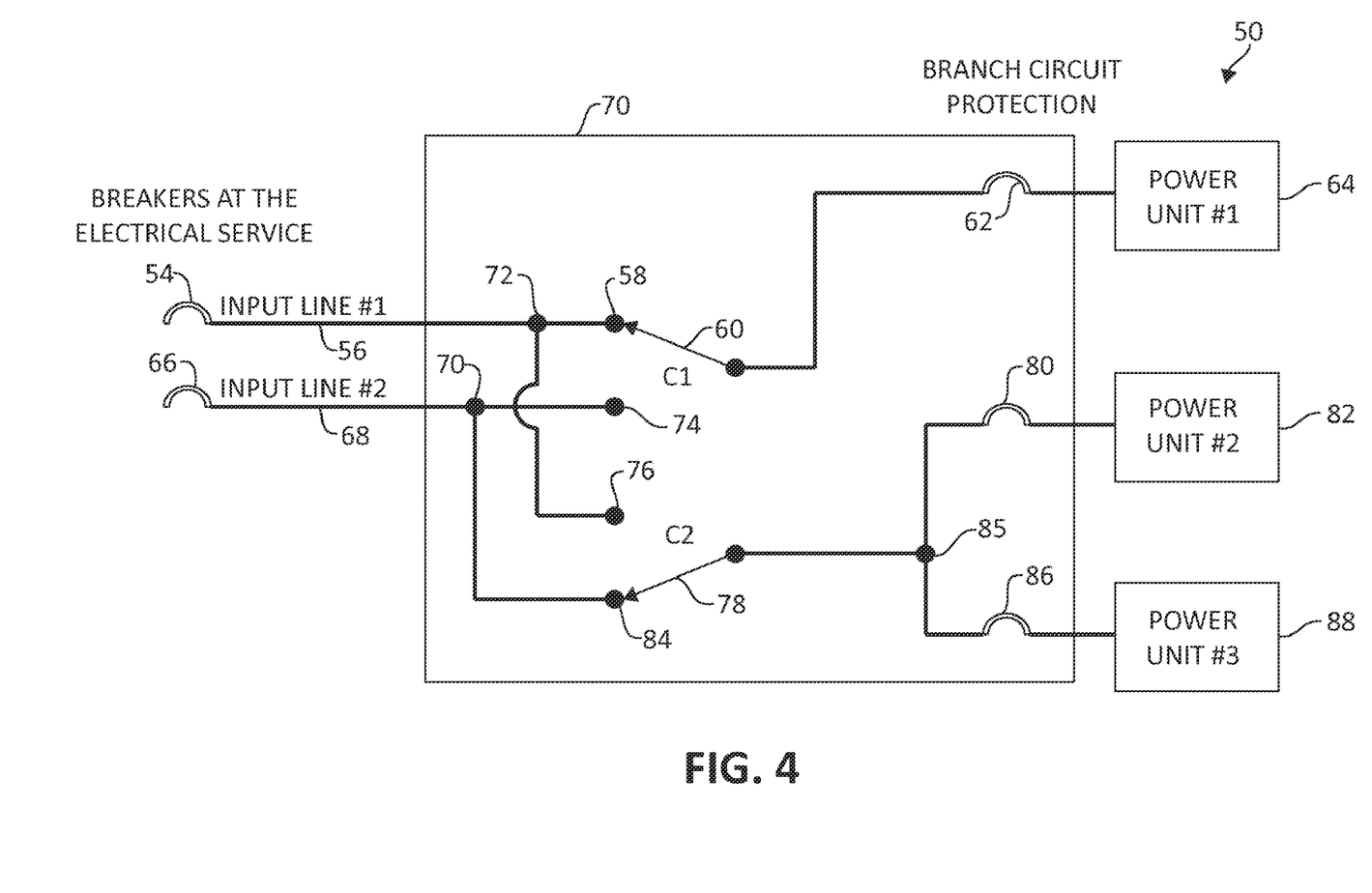
FIG. 4 is a block/schematic diagram of the exemplary dual line active automatic transfer switch shown in FIG. 3 in an additional mode of operation.

Turning now to FIG. 4, following, a power transfer system 71 including an ATS 70 is shown. ATS 70 includes the major components depicted in FIG. 3, previously, yet in a second mode (state) of operation. Control lines from each of the switch structures to the controller 55 are omitted in the following figures so as to provide more visual clarity. In the depicted embodiment, the switch structure 60 remains at the position shown coupled to node 58, which allows power from the input line 56 to be supplied to the PSU 64. In contrast, the switch structure 78 is shown in a second position coupled to node 84, allowing power from the input line 68 to be supplied to each of the PSUs 82 and 88 through shared node 85.

In the depicted operating mode, both line cord power is in tolerance, and the N+1 PSUs are functioning normally. This mode of operation may occur in the typical scenario where both line cord power is operating normally and where N is even (e.g., 2, 4, 6). In the depicted embodiment shown in FIG. 4, N=2 and N+1 PSUs are installed for redundancy. Where N is even, the general distribution for the N+1 power supply units will connect N/2 units to input line 68 (input line #2). The remaining units will be connected to input line 56 (input line #1). The total system load current is $I_{sys}$. With both line cords available, input line 56 supplies $I_{sys}*((N/2)+1)/(N+1)$ amperes. Input line 68 supplies $I_{sys}*N/2(N+1)$ amperes. In the event that a line cord is lost, or a PSU fails, a single line cord would be required to supply the entire $I_{sys}$ current. The service breakers 54 and 66 thus need to be rated to supply the entire $I_{sys}$ current.

In implementations where N is odd, the general distribution for the N+1 PSUs will connect (N+1)/2 units to each input line. The total system current is again, $I_{sys}$. With both line cords available, input line 56 and input line 68 supply $I_{sys}/2$ amperes. Again, in the event that a line cord is lost or a PSU fails, a single line cord would be required to supply the entire current, the service breakers 54 or 66 feeding this line court would need to be rated to handle this current.

The PSUs 64, 82, and 88 referred to previously in FIGS. 3, 4, and in the following figures, may be any power system load equipment(s). In some embodiments, the PSUs may include an alternating current (AC) to direct current (DC) power supply. In other embodiments, however, the PSUs may include an uninterruptible power supply (UPS) device, battery charger, or any other device(s) that dissipates or converts electrical energy. In one embodiment, the illustrated embodiments may be implemented using safety contactor sets as will be described, following, under logic control. The logic monitors the input line voltages and energizes the contactor coils to connect the best quality power source to the PSU(s).

Figure 5:
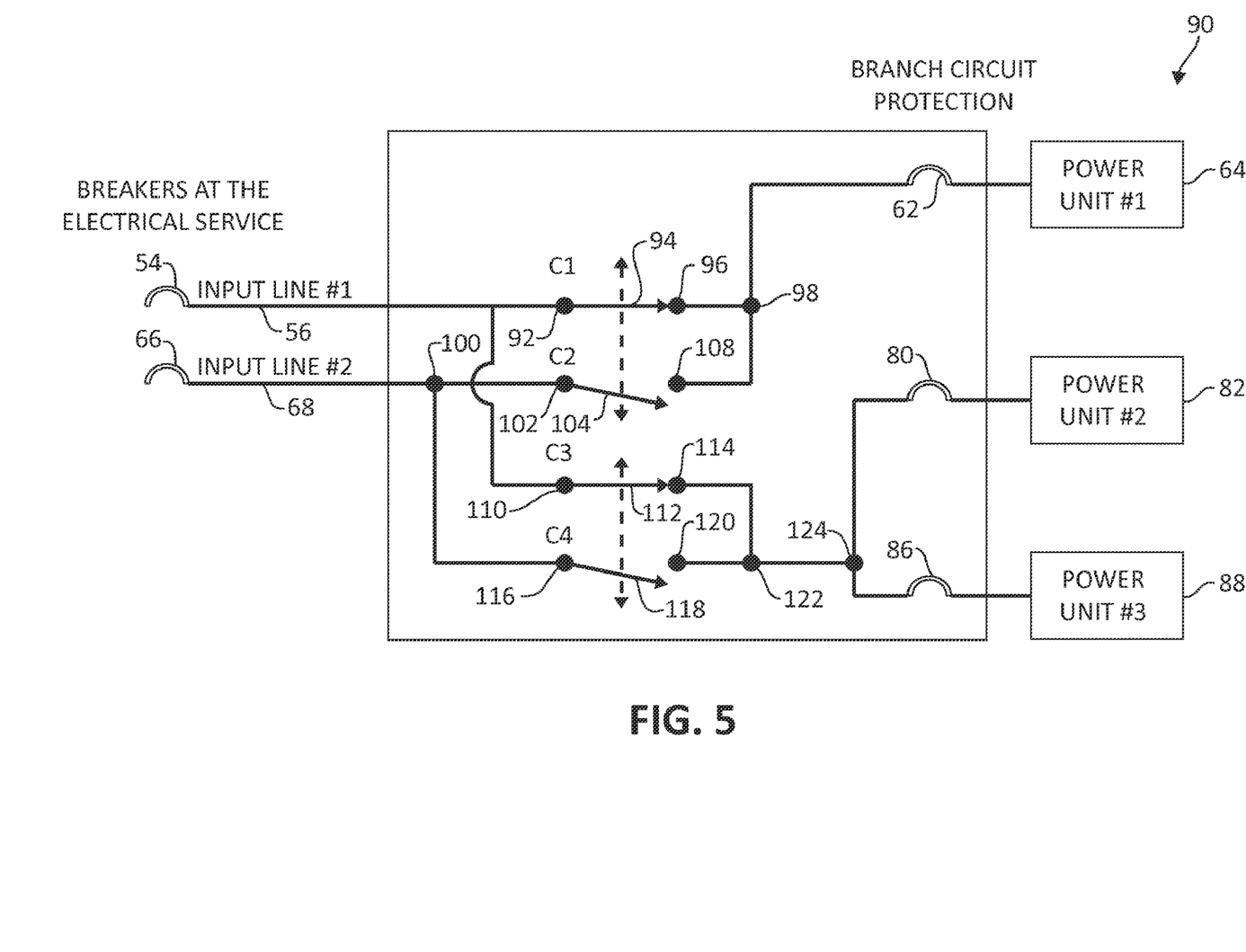
FIG. 5 is a block/schematic diagram of an additional exemplary dual line active automatic transfer switch incorporating contactors connected in a safety contactor set.

Turning to FIG. 5, following, an exemplary ATS 91 as part of an overall power transfer system 90 is illustrated. System 90 incorporates many of the components seen in FIGS. 3 and 4, previously, including input lines 56 and 68, and branch circuit protection devices 62, 80, and 86. ATS 91 implements the switch structures previously described (e.g., in FIG. 4, previously) as a set of two safety contactors. Contactor 94 is coupled between nodes 92 and 96, while contactor 104 is coupled between nodes 102 and 108. Contactors 94 and 104 are mechanically and electrically interlocked to form one safety contactor of the safety contactor set. Similarly, contactor 112 is coupled between nodes 110 and 114, and contactor 118 is coupled between nodes 116 and 120, also configured as a safety contactor of the set. While contactor 104 is open, contactor 94 is closed, and vice-versa. Similarly, while contactor 118 is open, contactor 112 is closed, and vice-versa.

ATS 91, as well as ATS 70 and ATS 52 may be adapted for implementation for single phase or three phase input power, as the skilled artisan will appreciate. For single phase power, in one exemplary embodiment, four contactors may be connected, each having two poles apiece. The four contactors are joined to form two safety contactor sets, as previously described. For three phase input power, again in one exemplary embodiment, four contactors may be connected, each having four poles apiece. Again, the four contactors are joined to form two safety contactor sets. Again, the skilled artisan will appreciate that the mechanisms of the illustrated embodiments may be applied to any single or poly phase power design.

The dual line active ATS embodiments shown in FIGS. 3, 4, and 5 will lose current sharing functionality when the PSU 64 (PSU #1) fails or is offline. Even though power is available from both input lines 56 and 68, a single input line will source all of the system current. In FIG. 3, input line 56 would then power the system. In this case, the ability to maximize fault propagation is lost.

Figure 6:
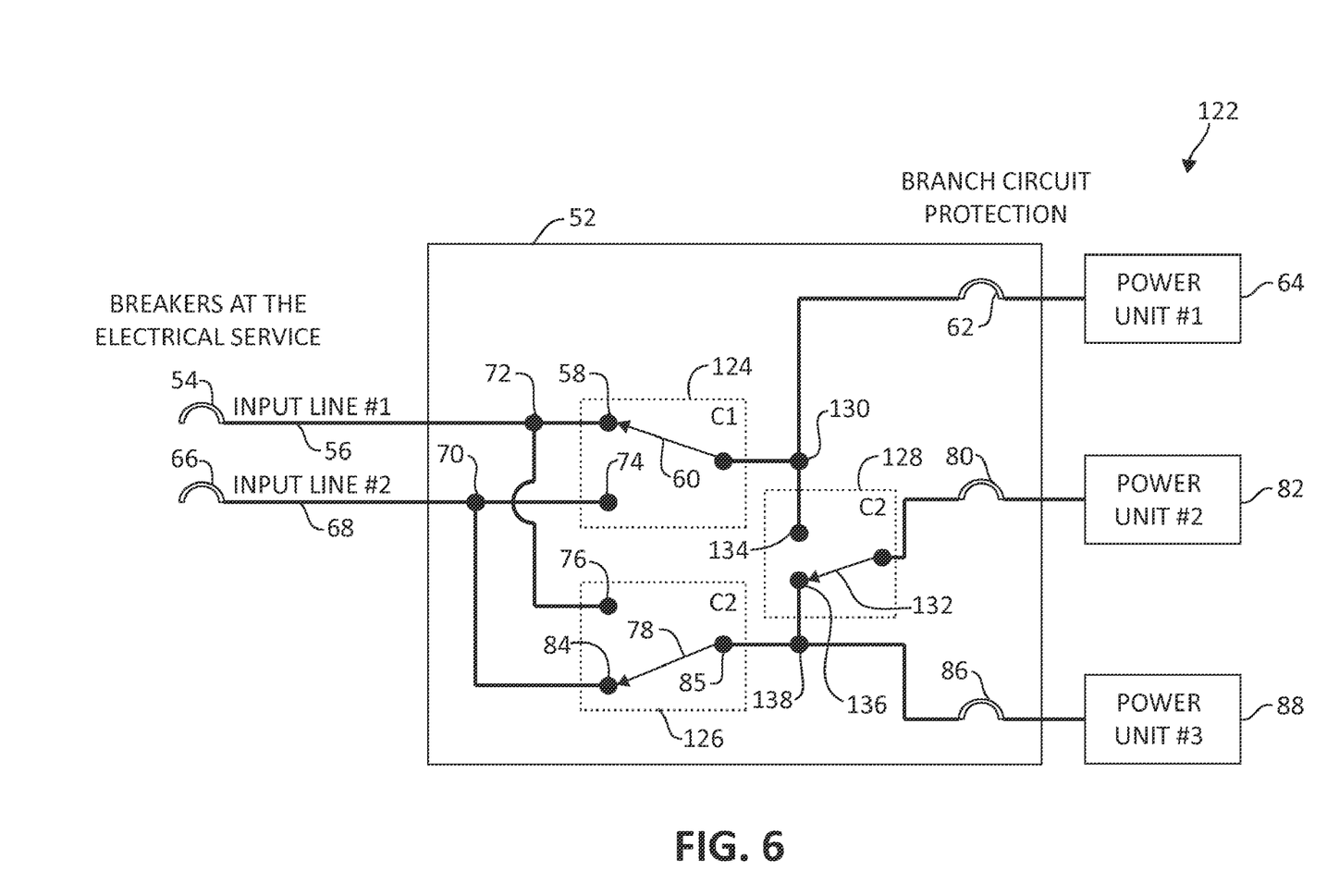
FIG. 6 is a block/schematic diagram of an additional exemplary dual line active automatic transfer switch incorporating a third switch mechanism for load balancing.

To address this issue, additional embodiments of the mechanisms of the present invention may be implemented. In one such embodiment, which applies when N is even, current sharing may continue to be provided between input line cords even when one PSU is lost or offline. Turning now to FIG. 6, an illustration of such an embodiment of a power transfer system 122 including an ATS 123 is depicted. ATS 123 includes many of the components of the previously depicted ATS devices, such as ATS 70 (FIG. 4) and controller 55, which in this case, provides logic control to all three switch structures. In addition to the two switch structures previously described, ATS 123 includes a third switch structure including contactor 132 connected between branch circuit protection device 80 and shared node 138 between PSU 82 and PSU 88. In the depicted embodiment, the contactor 132 is connected to node 136, providing shared power to PSU 82 and PSU 88 from input line 68 via shared node 138.

Figure 7:
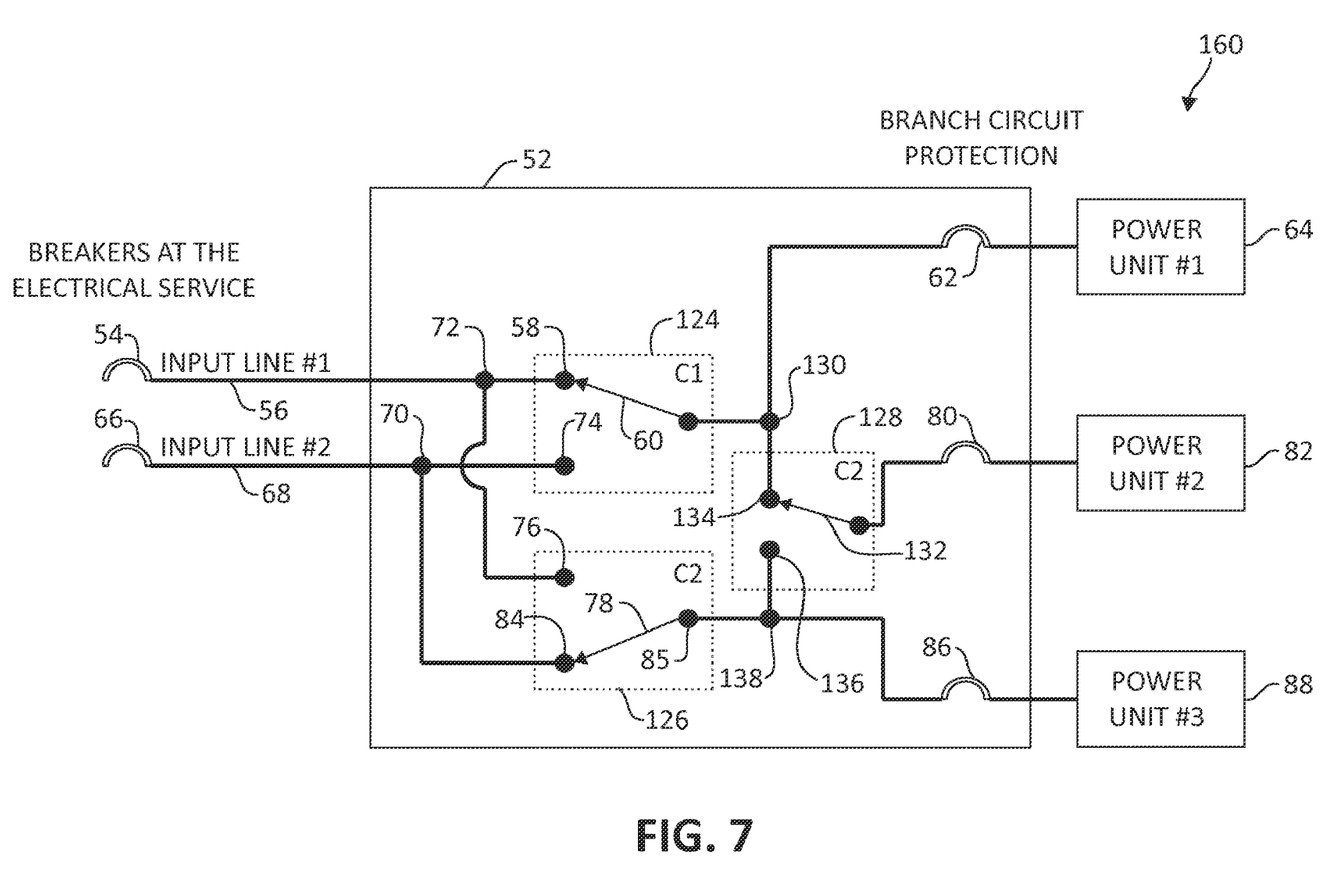
FIG. 7 is a block/schematic diagram of the exemplary dual line active automatic transfer switch shown in FIG. 6 in an additional mode of operation.

FIG. 7, following, depicts an additional mode of operation of ATS 123, where the PSU 64 has failed or gone offline, yet both line cord power is functional and in tolerance. In this case, controller 55 detects the failure and actuates the contactor 132 to the position shown connecting node 134 with the PSU 82. In this way, the power from input line 56 is provided to the PSU 82, while the power from input line 68 is provided to the PSU 88 in a load balancing operation.

Figure 8:
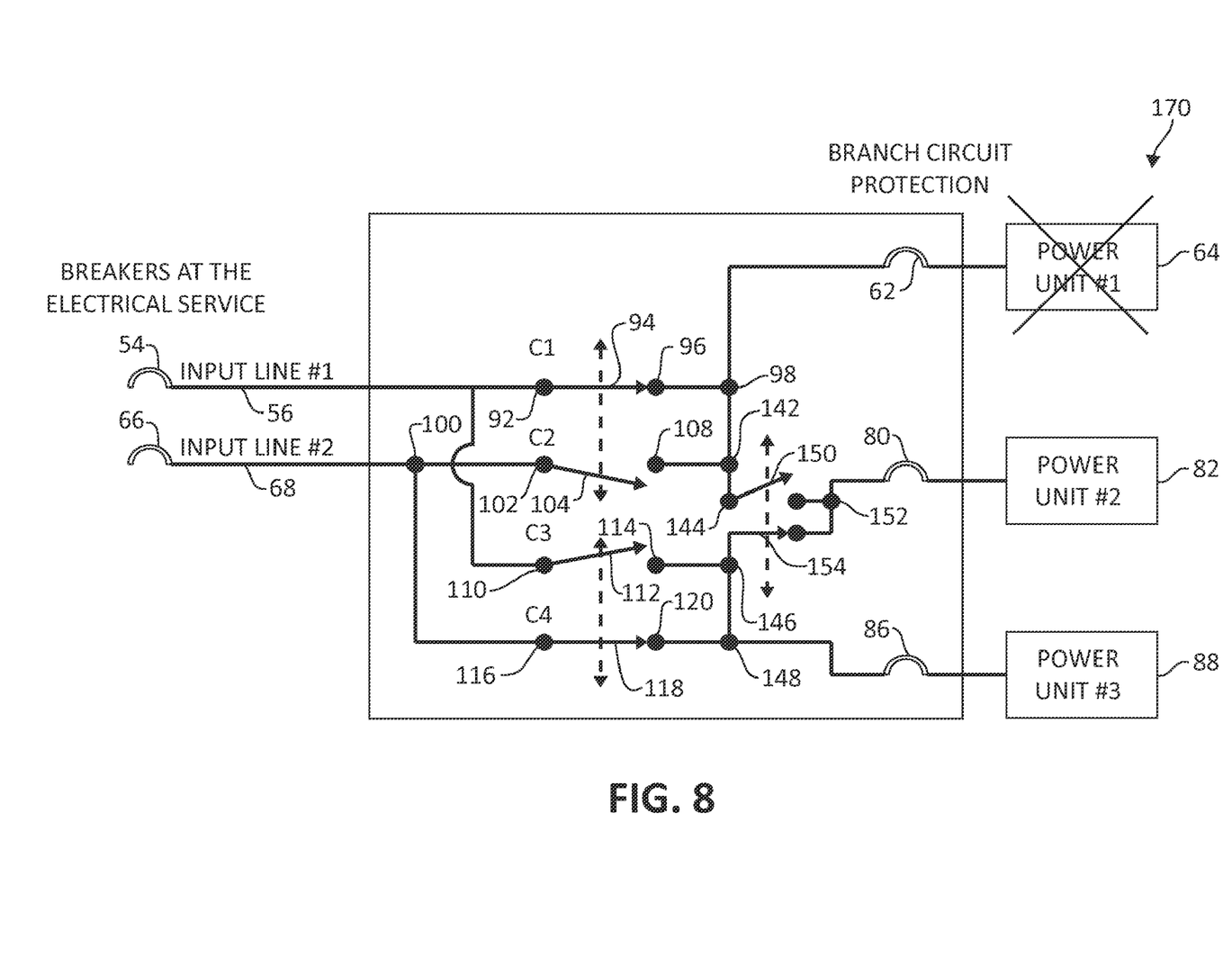
FIG. 8 is a block/schematic diagram of an additional exemplary dual line active automatic transfer switch incorporating a third switch structure having contactors connected in a contactor safety set.

FIG. 8, following, depicts the same scenario depicted in FIG. 7, but with safety contactors configured as each of the three switch structures in a ATS 172 (as part of overall power transfer system 170). Accordingly, contactors 150 and 154 are configured as a safety contactor, with contactor 150 connected between nodes 144 and 152, and contactor 154 connected between nodes 146 and 152. After determining PSU 64 is offline or has failed, controller 55 actuates the safety controller such that contactor 150 is closed while contactor 154 is open, thus providing power from input line 56 to the PSU 82, and power from the input line 68 to the PSU 88 in a load balancing operation.

While one or more embodiments of the present invention have been illustrated in detail, the skilled artisan will appreciate that modifications and adaptations to those embodiments may be made without departing from the scope of the present invention as set forth in the following claims.

What is claimed is:

1. A dual line automatic transfer switch (ATS) adapted to provide power to a plurality of power supply units (PSUs) configured in an N+1 architecture, comprising:
    a first switch structure connected to a first PSU of the plurality of PSUs, and operable between a first position connecting a first input line of the dual line to the first PSU and a second position connecting a second input line of the dual line to the first PSU;
    a second switch structure connected to at least one additional PSU of the plurality of PSUs, and operable between a third position connecting the first input line to the at least one additional PSU and a fourth position connecting the second input line to the at least one additional PSU; and
    a third switch structure connected to at least one of the first and second switch structures, wherein the third switch structure is operable to direct power from the at least one of the first and second switch structures to the plurality of PSUs in a load balancing operation,
        wherein the first and second switch structures are operable between each of the first, second, third, and fourth positions to alternatively connect each of the plurality of PSUs to one of the first and second input lines and connect, when each of the dual lines is charged, both of the first and second input lines to at least one of the plurality of PSUs.

2. The automatic transfer switch of claim 1, wherein the first and second switch structures are connected to a controller, wherein the controller is adapted to monitor line quality of the first and second input lines and actuate the first and second switch structures according to the line quality.

3. The automatic transfer switch of claim 1, wherein the first switch structure includes first and second contactors configured as a first safety contactor, and the second switch structure includes third and fourth contactors configured as a second safety contactor, the first and second safety contactors forming a safety contactor set, wherein the first and third contactors are connected to the first input line, and the second and fourth contactors are connected to the second input line.

4. The automatic transfer switch of claim 1, wherein the third switch structure is connected to a controller, wherein the controller is adapted to detect a failure of the at least one of the plurality of PSUs and actuate the third switch structure pursuant to the load balancing operation.

5. The automatic transfer switch of claim 1, wherein the third switch structure includes first and second contactors configured as a safety contactor, wherein the safety contactor is connected to the at least one of the plurality of PSUs.

6. The automatic transfer switch of claim 1, further including a branch circuit protection device coupled between the first switch structure and the first PSU to provide branch circuit protection.

7. A dual line automatic transfer switch (ATS), comprising:
first and second inputs;
a first switch structure;
a second switch structure;
a plurality of power supply units (PSUs) configured in an N+1 architecture; and
a third switch structure connected to at least one of the first and second switch structures, wherein the third switch structure is operable to direct power from the at least one of the first and second switch structures to the plurality of PSUs in a load balancing operation, wherein:
the first and second switch structures are connected between the first and second inputs and the plurality of PSUs,
the first switch structure is operable between a first position connecting the first input to a first PSU and a second position connecting the second input to the first PSU,
the second switch structure is operable between a third position connecting the first input to a second PSU and a fourth position connecting the second input to the second PSU, and
the first and second switch structures are configured to provide power, when each of the first and second inputs is charged, from each of the first and second inputs to at least one of the first PSU and the second PSU.

8. The automatic transfer switch of claim 7, further including a controller connected to each of the first and second switch structures, wherein the controller is adapted to monitor line quality of the first and second input lines and actuate the first and second switch structures according to the line quality.

9. The automatic transfer switch of claim 7, wherein the first switch structure includes first and second contactors connected as a first safety contactor, and the second switch structure includes third and fourth contactors connected as a second safety contactor, the first and second safety contactors forming a safety contactor set, wherein the first and third contactors are connected to the first input, and the second and fourth contactors are connected to the second input.

10. The automatic transfer switch of claim 7, further including a controller connected to the third switch structure, wherein the controller is adapted to detect a failure of the at least one of the plurality of PSUs and actuate the third switch structure pursuant to the load balancing operation.

11. The automatic transfer switch of claim 7, wherein the third switch structure includes first and second contactors configured as a safety contactor, wherein the safety contactor is connected to the at least one of the plurality of PSUs.

12. The automatic transfer switch of claim 7, further including a branch circuit protection device coupled between the first switch structure and a first PSU to provide branch circuit protection.

13. A method of manufacturing a dual line automatic transfer switch (ATS), comprising:
providing first and second inputs;
providing a first switch structure;
providing a second switch structure;
providing a plurality of power supply units (PSUs) configured in an N+1 architecture; and
providing a third switch structure connected to at least one of the first and second switch structures, wherein the third switch structure is operable to direct power from the at least one of the first and second switch structures to the plurality of PSUs in a load balancing operation, wherein:
the first and second switch structures are connected between the first and second inputs and the plurality of PSUs,
the first switch structure is operable between a first position connecting the first input to a first PSU and a second position connecting the second input to the first PSU,
the second switch structure is operable between a third position connecting the first input to a second PSU and a fourth position connecting the second input to the second PSU, and
the first and second switch structures are configured to provide power, when each of the first and second inputs is charged, from each of the first and second inputs to at least one of the first PSU and the second PSU.

14. The method of manufacture of claim 13, further including providing a controller connected to each of the first and second switch structures, wherein the controller is adapted to monitor line quality of the first and second input lines and actuate the first and second switch structures according to the line quality.

15. The method of manufacture of claim 13, wherein providing the first switch structure includes providing first and second contactors configured as a first safety contactor, and providing the second switch structure includes providing third and fourth contactors configured as a second safety contactor, the first and second safety contactors forming a safety contactor set, wherein the first and third contactors are connected to the first input, and the second and fourth contactors are connected to the second input.

16. The method of manufacture of claim 13, further including providing a controller connected to the third switch structure, wherein the controller is adapted to detect a failure of the at least one of the plurality of PSUs and actuate the third switch structure pursuant to the load balancing operation.

17. The method of manufacture of claim 13, wherein providing the third switch structure includes providing first and second contactors configured as safety contactor, wherein the safety contactor is connected to at least one of the plurality of PSUs.

18. The method of manufacture of claim 13, further including providing a branch circuit protection device coupled between the first switch structure and a first PSU to provide branch circuit protection.

* * * * *